Nov. 14, 1950 W. ABILDGAARD ET AL 2,529,530
LIVESTOCK SPRAYER
Filed July 1, 1946 3 Sheets-Sheet 3
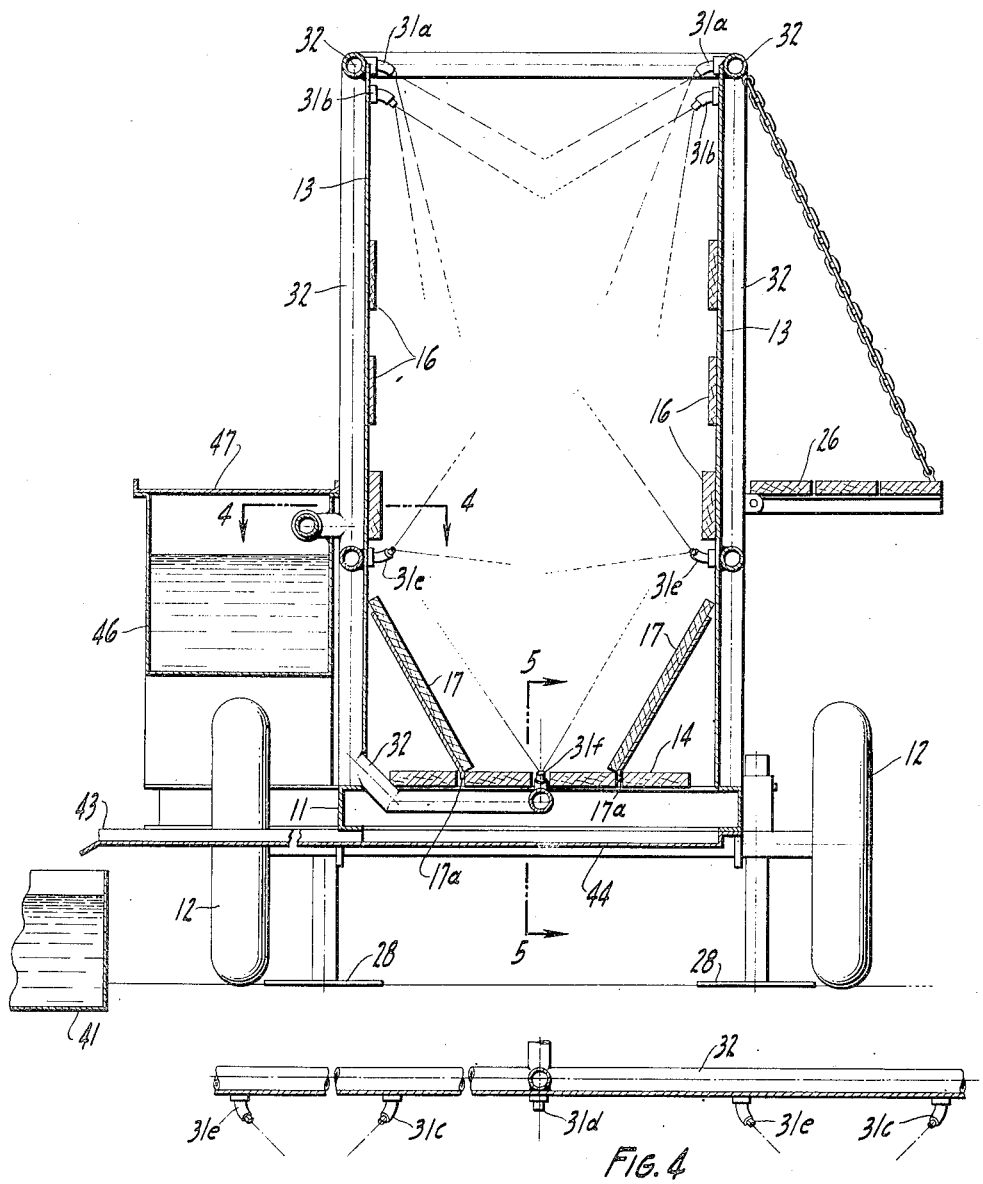
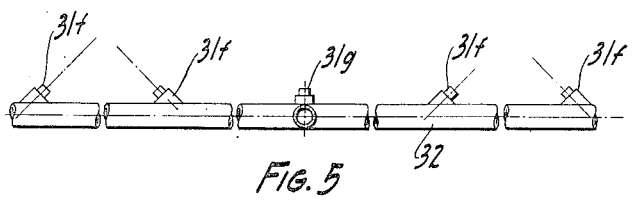
INVENTORS
WILLIAM ABILDGAARD
WILLIAM H. ABILDGAARD
ATTORNEY Patented Nov. 14, 1950

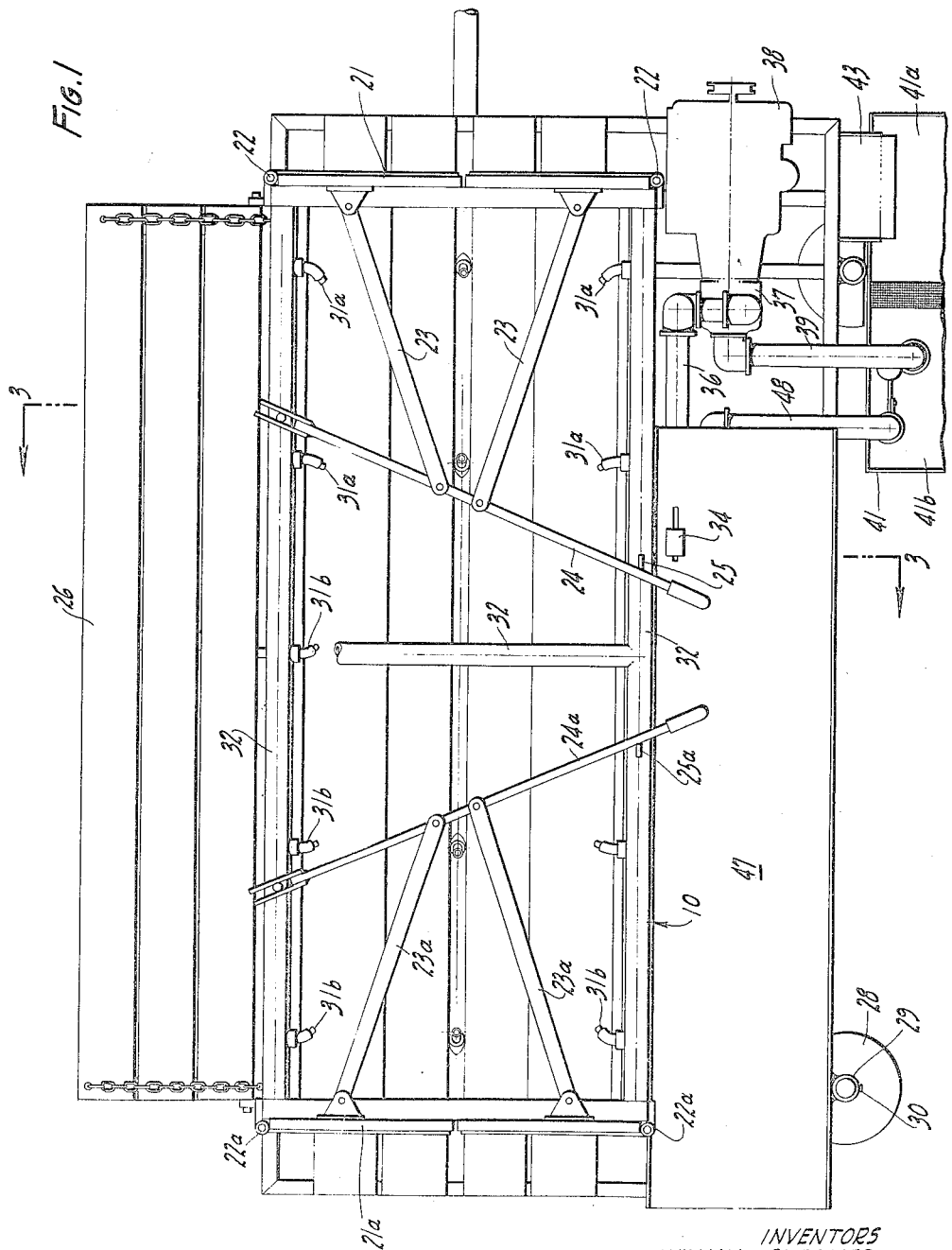

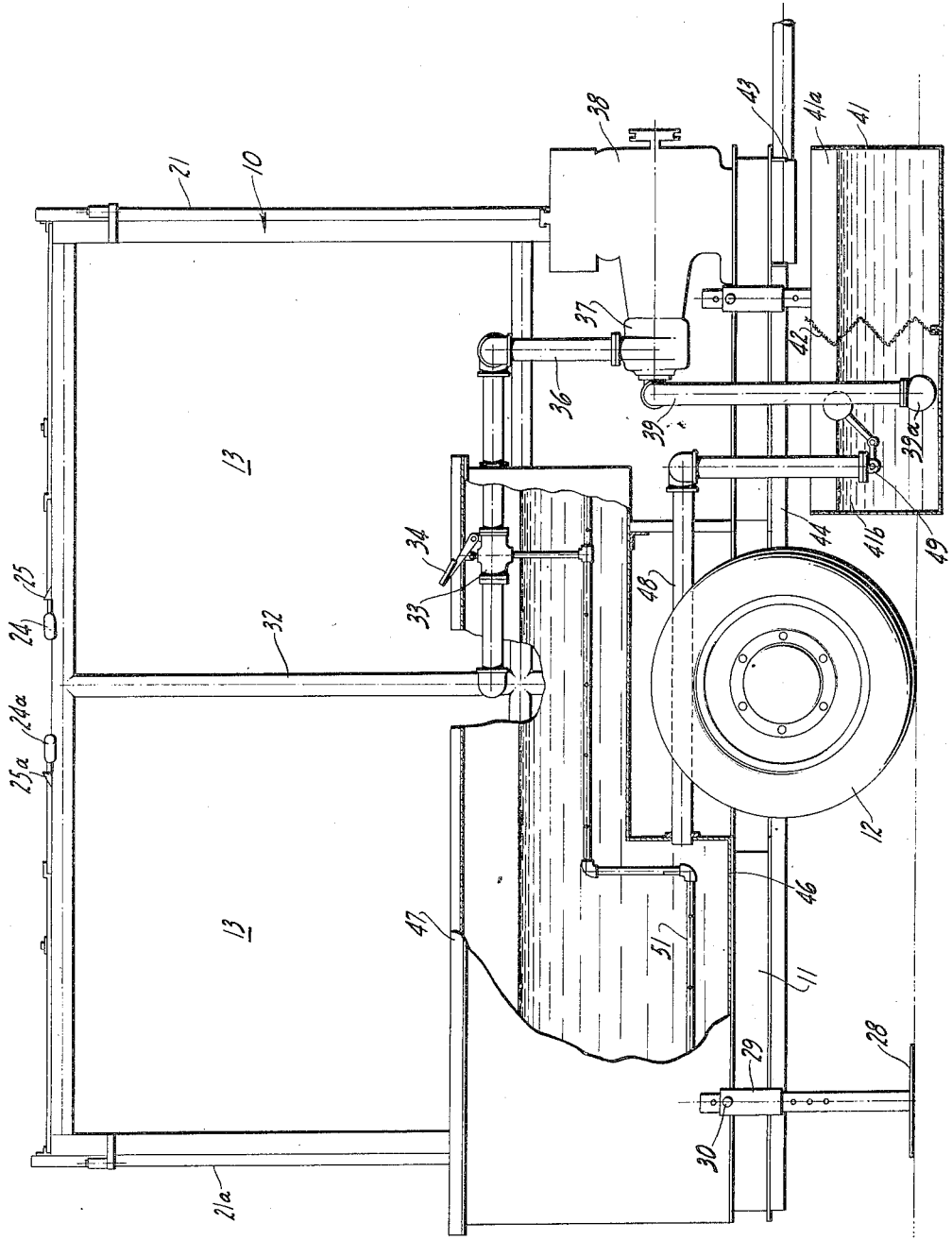

2,529,530

UNITED STATES PATENT OFFICE 2,529,530

LIVESTOCK SPRAYER

William Abildgaard and William H. Abildgaard, San Jose, Calif., assignors, by mesne assignments, to Livestock Sprayer Mfg. Co., San Jose, Calif., a corporation of California Application July 1, 1946, Serial No. 680,696

2 Claims. (Cl. 119—159)

This invention relates to livestock sprayers and is concerned more particularly with a portable sprayer of the above character which can be transported readily from place to place for use in controlling livestock pests, such as flies, ticks, grubs, and lice.

It is a general object of the invention to provide an improved sprayer for livestock.

Another object of the invention is to provide a livestock sprayer utilizing advantageously disposed pressure sprays for complete wetting of the animal with a spray solution.

A further object of the invention is to provide portable apparatus of the above character which will enable rapid spraying of livestock without requiring driving of the livestock from one location to another and which will enable spraying of a large number of animals within a short period of time.

Other objects and advantages will be apparent from the following description of a preferred embodiment of the invention as illustrated in the accompanying drawings, in which:

Figure 1 is a plan view of the livestock sprayer.

Figure 2 is a side elevational view of the sprayer partially broken away and shown in section to illustrate details of the construction.

Figure 3 is a transverse sectional view taken as indicated by the line 3—3 in Figure 1.

Figure 4 is a fragmentary sectional view taken as indicated by the line 4—4 in Figure 3.

Figure 5 is a fragmentary sectional view taken as indicated by the line 5—5 in Figure 3.

In the past the common practice in controlling insect pests on livestock, such as cattle, has been carried out by providing a vat or dip to which the livestock must be brought and through which they are driven to apply the insecticide. It is common practice to completely immerse the animals by pushing them under as they swim through the dip. This has resulted in several disadvantages, such as a loss of weight in cattle, for example, of from three to six or more pounds per animal in driving to the dip, as well as a further loss of weight in some animals because of swallowed solution which leaves them sick for a matter of weeks. In addition, the concrete or other dip construction is of substantial size and its expense precludes the smaller livestock grower from its use so that in these cases even further travel is required to obtain the use of the dipping vats.

In accordance with the instant invention, a livestock sprayer of portable character is provided and specifically of a trailer construction so that it can be towed by a truck or automobile to the herd of livestock and the livestock can be passed through the sprayer and subjected to a pressure spray of advantageous character to effect complete wetting of the animals without harmful effect.

Referring to the drawings, the sprayer includes a body having a frame 10 of pipe construction supported on a base portion 11 which may be formed of channels or other structural steel. The base portion 11 carries suitable journal supports for the wheels 12. The side walls of the body may comprise sheet steel members 13 which may be welded or otherwise secured to the frame 10 and a floor 14 of wooden planking extending longitudinally of the base frame 11. Also, the side walls 13 may be provided with planking or other protecting strips 16 so the livestock will not contact the steel side plates. For purposes of locating the livestock within the sprayer in a central position, similar inclined centralizing guides 17 are provided which have lower extensions 17a fitting between the slots of adjacent planks 14. The guides 17 are removable for cleaning or for varying the location of the animal within the sprayer. The respective ends of the sprayer are closed by front doors 21 pivoted at 22 and connected by links 23 with an operating handle 24 engaging a stop or catch 25 on the body. The rearward doors 21a are similarly pivoted at 22a and are operated through a similar linkage system 23a from an operating handle 24a. Platforms may be provided along either side of the body as shown at 26 and at 47. The platform 47 forms the cover for the make-up tank 46 of the spray system referred to hereinafter.

When in use the weight of the sprayer and the animals therein may be removed from the wheels 12 by lowering suitable auxiliary supports 28. The supports 28 are slidable within suitable bosses or guides 29 on the frame and may be secured in adjusted position by means of bolts 30.

The spray system includes a plurality of series of nozzles 31a—31e which are described in greater detail hereinafter and which are mounted on corresponding supply pipes 32. The supply pipes 32 are suitably interconnected and the flow of liquid thereto is controlled by a two-way valve 33 having a foot control pedal device 34 leading to the discharge pipe 36 of a suitable pressure pump, such as a centrifugal pump 37. The source of power for the pump 37 may be a conventional internal combustion engine 38. The intake pipe 39 of the pump 37 has its foot valve 39a disposed within a sump tank 41 which is mounted on the ground along side the sprayer and is divided into two sections by a corrugated screen 42. Section 41a of the sump tank 41 receives liquid from a discharge chute 43 leading from a drainage tank 44 extending entirely below the body of the trailer to receive drainage spray solution from the animals and to return it to the sump tank for recirculation.

The sprayer also includes a make-up tank 46 which may be of welded sheet steel construction and disposed along one side of the trailer body with a cover 47 providing a platform for the operator. For make up of liquid in the sump tank a make-up pipe 48 extends downwardly into the section 41b of this sump tank and has a conventional form of float valve 49 at its lower end.

For agitation of the spray solution within the make-up tank 46 an apertured pipe system 51 is disposed therein having an inlet from the two-way valve 33 so that in the normal position of the valve control pedal 34, as shown, and with the engine and pump in operation the liquid will be circulated between the sump tank 41 and the make-up tank 46.

The nozzle system comprises a plurality of sets of nozzles so arranged and located as to direct the pressure spray against all parts of an animal in the sprayer and preferably against the grain of the hair of the animal. In the present embodiment two opposed similar sets of spray nozzles 31 are provided along the top portion of the side plates 13 and, as shown in Figures 1 and 3, the two spray nozzles 31a adjacent the front of the sprayer of each top set of nozzles are directed downwardly and rearwardly while the three remaining spray nozzles 31b of each top set are directed downwardly and forwardly. As seen in Figures 3 and 4, two intermediate sets of spray nozzles are located along the side walls of the sprayer immediately below and protected by the lowermost side planks 16. In this case the two forward nozzles 31c of each set are directed rearwardly at an angle of 45° and upwardly, the center nozzle 31d is directed straight outwardly and the two rearward nozzles 31e are directed forwardly 45° and upwardly.

In connection with all of the foregoing nozzles, an adjustable swivelled mounting of the nozzle is provided.

The bottom row of nozzles, as seen in Figure 5, include respective end pairs 31f which are angled toward each other at approximately 45° and a center nozzle 31g which projects directly upward.

These nozzles are all preferably of a construction to provide a substantially cone-shaped spray and the arrangement and location are such that all parts of the animal including the inner portions of the legs and the under parts of the animal are completely wetted.

In operation the sprayer is towed to the desired location adjacent a corral chute or the like or in an open field and the auxiliary supports 28 are lowered and adjusted to provide a firm support for the sprayer without substantial weight on the wheels 12. The sump tank is installed in place on the ground along side the sprayer and the intake pipe 39 for the pump 37 and the make-up pipe 48 from the tank 46 are installed, all as shown in Figure 2.

In spraying of the animals the rearward doors 21a are opened by operation of the handle 24a and the animal, for example, a cow or steer, is driven into the sprayer and the rear doors 21a are then closed. The inclined centralizing members 17 insure the animal being centrally positioned with respect to the nozzle system. The foot pedal 34 is then operated for a period of about eight seconds to effect complete wetting of the animal. The character of spray provided by the nozzles and the directional positioning of the nozzle insures complete wetting of an animal in this period of time so that at the end of this time the front doors 21 are open and this animal is driven out of the sprayer. Drainage liquid from the animal flows back through the drain tank 44 to the sump tank 41. The front doors are then closed and the rear doors opened to admit another animal and the above procedure is repeated.

While we have shown certain preferred embodiments of the invention it will be seen that the invention is capable of variation and modification from the form shown so that its scope should be limited only by the scope of the claims appended hereto.

We claim:

1. A portable livestock sprayer comprising a body having side walls and an apertured bottom wall, wheeled supports for the body, gates at the respective ends of said body, said walls and said gates forming an enclosure for an animal, a spray system including a plurality of nozzles disposed about the bottom and side walls of the body, a supply tank mounted on and substantially against one of said walls with the top wall thereof providing an elevated platform form which the operator can view an animal in the enclosure, a drain tank below the apertured bottom wall, a pressure system including a pump and a valve for supplying liquid under pressure to the nozzles, gate operating means connected to said gates, means mounting said gate operating means in position to be accessible to an operator standing on said platform, and a device for operating said valve, said device also being mounted in a position to be accessible to an operator standing on said platform, whereby the operator can, from one standing position, operate both said gate operating means and said device.

2. A portable livestock sprayer comprising a body having side walls and an apertured bottom wall, wheeled supports for the body, gates at the respective ends of said body, said walls and said gates forming an enclosure for an animal, a spray system including a plurality of nozzles disposed about the bottom and side walls of the body, a supply tank mounted on and substantially against one of said side walls with the top wall thereof providing an elevated platform from which the operator can view an animal in the enclosure, a drain tank below the apertured bottom wall, a pressure system including a pump and a valve for selectively supplying liquid under pressure to the nozzles or to the supply tank, gate operating means connected to said gates, means mounting said gate operating means in position to be accessible to an operator standing on said platform, and a pedal for operating said valve, said pedal also being mounted in a position to be accessible to an operator standing on said platform, whereby the operator can, from one standing position, operate both said gate operating means and said pedal.

WILLIAM ABILDGAARD.
WILLIAM H. ABILDGAARD.

(References on following page)

REFERENCES CITED

The following references are of record in the file of this patent:

UNITED STATES PATENTS

| Number | Name | Date |
|---|---|---|
| 774,279 | Seabury | Nov. 8, 1904 |
| 790,005 | Smelser | May 16, 1905 |
| 870,766 | Eaton | Nov. 12, 1907 |
| 883,132 | Goff | Mar. 24, 1908 |
| 1,303,854 | Clark | May 20, 1919 |
| 1,511,450 | Findlay | Oct. 14, 1924 |
| 1,522,426 | Durham | Jan. 6, 1925 |
| 1,915,600 | French | June 27, 1933 |
| 2,480,600 | Paul, Jr. | Aug. 30, 1949 |

FOREIGN PATENTS

| Number | Country | Date |
|---|---|---|
| 312,677 | Germany | June 2, 1919 |